United States Patent
Hwang

(10) Patent No.: US 12,030,189 B2
(45) Date of Patent: Jul. 9, 2024

(54) METHOD OF CONTROLLING MOVEMENT OF ROBOT BASED ON LEVEL OF RISK AND APPARATUS USING THE SAME

(71) Applicant: XYZ, Inc., Seoul (KR)

(72) Inventor: Sung Jae Hwang, Seongnam-si (KR)

(73) Assignee: XYZ, Inc., Seoul (KR)

(*) Notice: Subject to any disclaimer, the term of this patent is extended or adjusted under 35 U.S.C. 154(b) by 383 days.

(21) Appl. No.: 17/370,030

(22) Filed: Jul. 8, 2021

(65) Prior Publication Data
US 2021/0331318 A1 Oct. 28, 2021

Related U.S. Application Data

(63) Continuation of application No. PCT/KR2020/005490, filed on Apr. 27, 2020.

(30) Foreign Application Priority Data

May 31, 2019 (KR) .................. 10-2019-0064283
Sep. 23, 2019 (KR) .................. 10-2019-0116722

(51) Int. Cl.
*B25J 9/16* (2006.01)
*B25J 11/00* (2006.01)
(Continued)

(52) U.S. Cl.
CPC ........... *B25J 9/1666* (2013.01); *B25J 9/1651* (2013.01); *B25J 9/1653* (2013.01); *B25J 9/1697* (2013.01);
(Continued)

(58) Field of Classification Search
CPC ...... B25J 9/1666; B25J 9/1651; B25J 9/1653; B25J 9/1697; B25J 13/085; B25J 13/087;
(Continued)

(56) References Cited

U.S. PATENT DOCUMENTS

| | | | |
|---|---|---|---|
| 10,915,965 B1* | 2/2021 | Fields | A61B 5/4064 |
| 11,119,216 B1* | 9/2021 | Ebrahimi Afrouzi | G05D 1/0274 |
| 2009/0012703 A1* | 1/2009 | Aso | G05D 1/0214 701/532 |
| 2010/0217528 A1* | 8/2010 | Sato | G05D 1/0214 701/300 |

(Continued)

FOREIGN PATENT DOCUMENTS

| | | | |
|---|---|---|---|
| JP | 2007260838 A | * | 10/2007 |
| JP | 2007260838 A | | 10/2007 |

(Continued)

OTHER PUBLICATIONS

International Search Report of PCT/KR2020/005490 dated Jul. 29, 2020.

*Primary Examiner* — Sohana Tanju Khayer
(74) *Attorney, Agent, or Firm* — Dinsmore & Shoh LLP; Yongsok Choi, Esq.

(57) ABSTRACT

A method of controlling a movement of a robot based on determination of a risk level includes: a risk level determining operation of determining a risk level related to a motion of the robot; and a robot control operation of controlling the movement of the robot based on the risk level, wherein the robot transfers an object. The determination of the risk level related to the motion of the robot includes: an internal risk level determining operation of determining an internal risk level based on an attribute of the object; and an external risk level determining operation of determining an external risk level related to an environmental state around the robot.

14 Claims, 8 Drawing Sheets

(51) Int. Cl.
  *B25J 13/08* (2006.01)
  *B25J 15/00* (2006.01)
  *B25J 19/02* (2006.01)
  *B25J 19/06* (2006.01)
  *G05D 1/00* (2006.01)

(52) U.S. Cl.
  CPC ........... *B25J 13/085* (2013.01); *B25J 13/087* (2013.01); *B25J 15/00* (2013.01); *B25J 19/023* (2013.01); *B25J 19/06* (2013.01); *G05D 1/0214* (2013.01); *B25J 11/008* (2013.01); *G05B 2219/40475* (2013.01)

(58) Field of Classification Search
  CPC . B25J 15/00; B25J 19/023; B25J 19/06; B25J 11/008; G05D 1/0214; G05D 2201/0211; G05B 2219/40475
  See application file for complete search history.

(56) References Cited

U.S. PATENT DOCUMENTS

| | | | | |
|---|---|---|---|---|
| 2015/0166059 | A1* | 6/2015 | Ko | B60W 30/09 |
| | | | | 701/28 |
| 2019/0311621 | A1* | 10/2019 | Pedersen | G08G 1/0962 |
| 2020/0290210 | A1* | 9/2020 | Ha | B25J 11/0045 |
| 2021/0206367 | A1* | 7/2021 | Liu | G08G 1/0112 |

FOREIGN PATENT DOCUMENTS

| | | |
|---|---|---|
| JP | 2007283450 A | 11/2007 |
| JP | 2007290056 A | 11/2007 |
| JP | 4984576 B2 | 7/2012 |
| KR | 1020080065281 A | 7/2008 |
| KR | 1020100027013 A | 3/2010 |

* cited by examiner

METHOD OF CONTROLLING MOVEMENT OF ROBOT BASED ON LEVEL OF RISK AND APPARATUS USING THE SAME

CROSS-REFERENCE TO RELATED APPLICATIONS

This application is a continuation of International Application No. PCT/KR2020/005490 filed on Apr. 27, 2020, which claims priority to Korean Patent Application No. 10-2019-0064283 filed on May 31, 2019 and Korean Patent Application No. 10-2019-0116722 filed on Sep. 23, 2019, the entire contents of which are herein incorporated by reference.

BACKGROUND

1. Field

The present disclosure relates to a method of controlling a movement of a robot based on determination of a risk level, and a robot apparatus using the method. More particularly, the present disclosure relates to a method and apparatus for determining a level of risk related to an object transferred by a robot or an external environment, and dynamically controlling a movement or a moving path of the robot based on the determined risk level.

The present disclosure relates to a method of controlling a robot arm based on determination of a level of risk, and a robot arm apparatus using the method. More particularly, the present disclosure relates to a method and apparatus for determining a level of risk related to an object, such as a cup, gripped by a robot arm, and controlling a movement of the robot arm based on the determined level of risk.

2. Description of the Related Art

With the development of robot technology, a robot technology in which an unmanned robot makes beverages, cooks dishes, etc., and transfers and collects the beverages, dishes, etc. For example, a robot capable of transferring food and beverages such as prepared coffee, bread, food, and the like to a location of a customer as well as a barista robot for making coffee has been developed.

When the robot moves, there is a risk that may occur due to food transferred by the transfer robot, contents contained in a cup, spilling, or colliding with a person on a moving path. Therefore, a new method is required to determine a level of risk associated with an object transferred by a robot and safely control movement of the robot based on the determined risk level.

In addition, with the development of robot technology, technology in which an unmanned robot makes beverages or cooks dishes and transfers the beverages or dishes has been developed. For example, in the case of making coffee, a robot is being developed which automatically performs a process from green bean roasting to a grinding process, and an extraction process of an espresso, and puts the prepared coffee in a cup to move the prepared coffee to a desired position.

When the robot moves, there is a risk that may occur when contents contained in a cup are spilled or collide with a person on a moving path. Accordingly, there is a need for a method of determining a level of risk associated with an object gripped by a robot arm and safely controlling movement of the robot arm based on the determined risk level.

SUMMARY

The present disclosure provides a method and apparatus for automatically determining a level of risk related to an object transferred by a robot and safely controlling a movement of the robot based on the determined risk level. The present disclosure provides a method and apparatus for controlling a movement of a robot, which may obtain information related to a level of risk in real time and prevent a safety accident while the robot moves food and beverages. The present disclosure provides a risk level determining apparatus capable of automatically determining an internal risk level related to an attribute of an object transferred by a robot. The present disclosure provides a risk level determining apparatus capable of automatically determining an external risk level related to an environmental state around a robot in relation to a movement of the robot. The present disclosure provides a method and apparatus for controlling a movement of a transfer robot based on determination of an internal risk level and an external risk level.

The present disclosure provides a method and apparatus for automatically determining a level of risk associated with an object, such as a cup, gripped by a robot arm and safely controlling a movement of the robot arm based on the determined risk level. The present disclosure provides a method and apparatus for controlling a movement of a robot arm to obtain information related to a level of risk in real time while making a beverage, gripping or moving a cup, and to prevent a safety accident. The present disclosure provides a risk level determining apparatus capable of automatically determining a risk level related to the making of a beverage by using a robot arm and the gripping and moving of a cup. The present disclosure provides realizing a safe control of a robot arm based on a risk level determination by automatically determining an attribute of an object gripped by the robot arm and contents of the object.

The problems to be solved of the present disclosure are not limited to the above-mentioned contents, and other technical problems that are not mentioned may be clearly understood by those of skill in the art from the following description.

Additional aspects will be set forth in part in the description that follows and, in part, will be apparent from the description, or may be learned by practice of the embodiments of the present disclosure.

A method of controlling a movement of a robot based on determination of a risk level includes a risk level determining operation of determining a risk level related to a motion of the robot, and a robot control operation of controlling the movement of the robot based on the risk level, wherein the robot transfers an object.

The risk level determining operation may include an internal risk level determining operation of determining an internal risk level based on an attribute of the object. The attribute of the object may include at least one of weight, temperature, fragility, sharpness, height, and size. The internal risk level determining operation may include determining an risk based on a movement speed of the robot, and the robot control operation may include controlling the movement speed of the robot to be decreased when the risk is higher than a predetermined reference.

The risk level determining operation may further include an external risk level determining operation of determining an external risk level related to an environmental state around the robot. The external risk level determining operation may include determining whether an object exists within a predetermined distance around the robot, and, when it is determined that the object exists, the robot control operation may include stopping the movement of the robot or changing a path or speed of the movement of the robot when the external risk is greater than a predetermined reference.

The robot control operation may include, when it is determined that the object exists, changing the path of the movement of the robot in a direction in which a distance from the object is increased. The robot control operation may include temporarily stopping the movement of the robot and continuously updating the determination of the risk level when it is determined that the risk level is higher than a predetermined reference, and resuming the movement of the robot when the risk level satisfies the predetermined reference. The risk level determining operation may include determining the risk level differently according to a method of transferring the object. The external risk level determining operation may include determining a risk level associated with an obstacle located on a path to a moving destination of the robot, and the robot control operation may include controlling the movement of the robot to a path to reduce the risk level.

The risk level associated with the obstacle may be related to at least one of a number of obstacles located on the path to the moving destination, a type of the obstacles, and whether the obstacles move, and the obstacles may include a person. When the risk level determined in the risk level determining operation exceeds a predetermined reference, risk related information may be output through an alarm sound or display information.

According to an embodiment, a robot apparatus of which movement is controlled based on determination of a risk level includes a risk level determining unit configured to determine a risk level related to a motion of the robot, and a movement controller configured to control a movement of the robot based on the risk level, wherein the robot transfers an object.

The risk level determining unit may include an internal risk level determining unit configured to determine an internal risk level based on an attribute of the object. The attribute of the object may include at least one of weight, temperature, fragility, sharpness, height, and size. The internal risk level determining unit may be further configured to determine an internal risk level based on a movement speed of the robot, and the movement controller may be further configured to control the movement speed of the robot to be decreased when it is determined that the internal risk level is higher than a predetermined reference. The risk level determining unit may further include an external risk level determining unit configured to determine the external risk level associated with an environmental state around the robot.

The robot apparatus may further include an image processing unit configured to perform image processing, and the image processing unit may be further configured to determine whether an object exists within a predetermined distance around the robot, the external risk level determining unit may be further configured to determine an external risk level based on whether the object exists, and the movement controller may be further configured to change a path or speed of the movement of the robot based on the external risk level. When it is determined that the object exists within the predetermined distance, the movement controller may be configured to change the path of the movement of the robot in a direction in which a distance from the object is increased. When it is determined that the risk level determined by the risk level determining unit is higher than a predetermined reference, the movement controller may be configured to temporarily stop the movement of the robot and continuously update the determination of the risk level, and when the risk level satisfies the predetermined reference, the movement controller may be configured to resume the movement of the robot. The risk level determining unit may be further configured to determine the risk level differently according to a method of transferring the object. The external risk level determining unit may be further configured to determine a level of risk associated with an obstacle located on a path to a moving destination of the robot, and the robot controller may be further configured to control the movement of the robot to a path to reduce the risk level.

The level of risk associated with the obstacle may be related to at least one of a number of obstacles located on a path to the moving destination, a type of the obstacles, and whether the obstacles move, and the obstacles may include a person.

When the risk level determined by the risk level determining unit exceeds a predetermined reference, the robot apparatus may include at least one of an audio output unit configured to output risk related information as an alarm sound and a display unit configured to output the risk related information through display information.

A method of controlling a movement of a robot arm based on a risk level determination includes a risk level determining operation of determining a risk level related to a robot arm operation, and a robot arm control operation of controlling a movement of the robot arm based on the risk level, wherein the robot arm grips an object.

The risk level determining operation may include measuring a weight and a temperature of an object gripped by the robot arm, and determining the risk level based on at least one of the measured weight and temperature of the object. The risk level determining operation may further include determining whether a cover of the object is present, and the risk level determining operation may include determining that the risk level is higher than a case in which the weight is small when the weight of the object is large, determining that the risk level is higher than a case in which the temperature is lower when the temperature is high, and determining that the risk level is higher than a case in which the cover of the object is present when the cover of the object is not present. The robot arm control operation may include controlling a movement speed of the robot arm to be decreased when it is determined that the risk level is higher than a predetermined reference.

The risk level determining operation may include determining whether an object exists within a predetermined distance around the robot arm, and the robot arm control operation may include stopping the movement of the robot arm when it is determined that the object exists. The risk level determining operation may include determining whether an object exists within a predetermined distance around the robot arm, and the robot arm control operation may include changing a path or speed of the movement of the robot arm when it is determined that the object exists.

The robot arm control operation may include, when it is determined that the object exists, changing a moving path of the robot arm into a region in which a distance from the object is increased. In addition, the robot arm control operation may include controlling the movement of the robot arm to be stopped when it is determined that the risk level is higher than a predetermined reference.

The risk level determining operation may include determining a risk level differently according to a method of gripping the object. The object may include a cup, and the risk level determining operation may include determining a risk level based on at least one of whether a content is in the cup and a temperature of the content in the cup. The risk level determining operation may include recognizing information printed on an object gripped by the robot arm, and determining the risk level based on the printed information. In addition, the risk level determining operation may include outputting risk related information through an alarm sound or display information when the determined risk level exceeds a predetermined reference.

According to an embodiment, an apparatus including a robot arm of which movement is controlled based on a risk level determination includes a risk level determining unit configured to determine a risk level associated with a robot arm operation, and a movement controller configured to control the movement of the robot arm based on the risk level, wherein the robot arm grips an object.

The apparatus may further include a weight sensor unit configured to measure a weight of an object gripped by the robot arm, and a temperature sensor unit configured to measure a temperature of the object gripped by the robot arm, and the risk level determining unit may be further configured to determine the risk level based on at least one of the measured weight and temperature of the object. The apparatus may further include an image processing unit configured to perform image processing, and, when a cover of the object is not present, it may be determined that the risk level is higher than when the cover of the object is present. The movement controller may be further configured to control a movement speed of the robot arm to be decreased when it is determined that the risk level is higher than a predetermined reference. The image processing unit may be further configured to determine whether an object exists within a predetermined distance around the robot arm, and the movement controller may be further configured to control a movement of the robot arm to be stopped when it is determined that the object exists. The image processing unit may be further configured to determine whether an object exists within a predetermined distance around the robot arm, and change a path or speed of a movement of the robot arm when it is determined that the object exists. When it is determined that the object exists, the movement controller may be configured to change a path of the movement of the robot arm into a region in which a distance from the object is increased. When it is determined that the risk level determined by the risk level determining unit is higher than a predetermined reference, the movement controller may be configured to control the movement of the robot arm to be stopped.

The risk level determining unit may determine a risk level differently according to a method of gripping the object. The object includes a cup, and the risk level determining operation may include determining the risk level based on at least one of whether a content is in the cup and a temperature of the content in the cup. The apparatus may further include an image processing unit configured to perform image processing, and the image processing unit is configured to recognize information printed on an object gripped by the robot arm, and the risk level determining unit may be configured to determine the risk level based on the printed information. The apparatus may include at least one of an audio output unit configured to output risk related information through an alarm sound, and a display unit configured to output the risk related information through display information, when the risk level determined by the risk level determining unit exceeds a predetermined reference.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, the present disclosure will be described in detail with reference to the accompanying drawings so as to be easily carried out by those of skill in the art. However, the present disclosure may have various different forms and configuration and is not limited to the embodiments described herein.

The terms used herein are intended to describe the embodiments, and are not intended to limit the present disclosure. In this present disclosure, the singular form includes a plural form unless expressly stated otherwise in the phrase.

It will be understood that the terms "comprises" and/or "comprising" used herein specify the presence of stated components, operations, and/or devices, but do not preclude the presence or addition of one or more other components, operations, and/or devices.

While such terms as "first", "second", etc., may be used to describe various components, such components are not to be limited to the above terms. The above terms are used only to distinguish one component from another component. Further, when it is determined that a detailed description of known techniques related to the present disclosure may obscure the gist of the present disclosure, the detailed description thereof will be omitted.

In addition, constituent elements shown in the embodiments of the present disclosure are independently shown to represent different characteristic functions, and it does not mean that each constituent element is configured by separate hardware or one software constituent unit. That is, for convenience of description, each component is described by listing each component, at least two components among the respective components may be combined to form one component, or one component may be divided into a plurality of components to perform a function. An integrated embodiment and a separated embodiment of each component are included in the scope of the present disclosure without departing from the spirit and scope of the present disclosure.

The present disclosure will be described below in more detail with reference to the accompanying drawings. The configuration of the present disclosure and an operation effect thereof will be clearly understood through the following detailed description.

Figure 1:
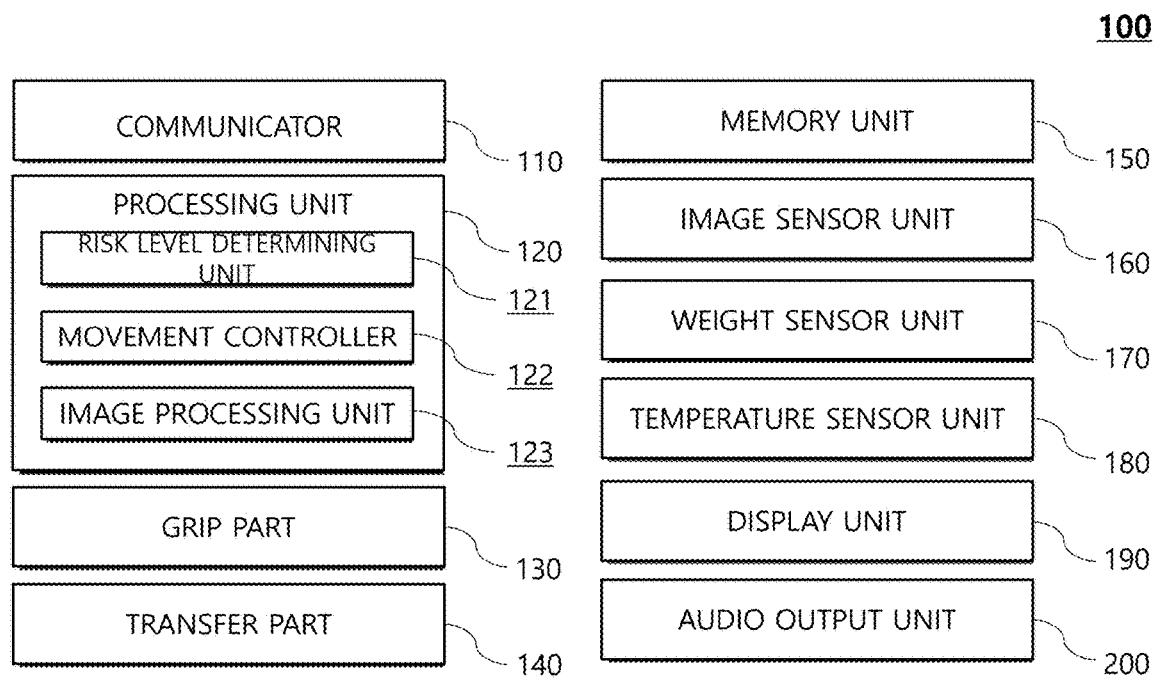
FIG. 1 is a block diagram of a configuration of a robot apparatus of which movement is controlled based on determination of a risk level according to an embodiment of the present disclosure.

FIG. 1 is a block diagram illustrating a configuration of a robot apparatus of which movement is controlled based on determination of a risk level according to an embodiment of the present disclosure.

Referring to FIG. 1, a robot apparatus 100 may include a communicator 110, a processing unit 120, a grip part 130, a transfer part 140, a memory unit 150, an image sensor unit 160, a weight sensor unit 170, a temperature sensor unit 180, a display unit 190, and an audio output unit 200, and some components may be omitted or additional components may be added as necessary.

The communicator 110 is configured to receive necessary information from an external server or an external apparatus, or transmit obtained information to the external server or the external apparatus, and the network may be a network connected by wire or wirelessly. Also, the network may be a network to which an external apparatus and the robot apparatus 100 are directly connected, or may be a private network generated by a repeater. The network may be a communication network that is a high-speed backbone network of a large-sized communication network capable of large-capacity, long-distance voice, and data service, and may be a next-generation wired/wireless network for providing an Internet or a high-speed multimedia service. When the network is a wireless communication network, the network may include cellular communication or near field communication. For example, the cellular communication may include at least one of long-term evolution (LTE), LTE advanced (LTE-A), $5^{th}$ generation (5G), code division multiple access (CDMA), wideband CDMA (WCDMA), universal mobile telecommunications system (UMTS), wireless broadband (WiBro), and global system for mobile communications (GSM). The near field communication may include at least one of wireless fidelity (Wi-Fi), Bluetooth, Zigbee, and near field communication (NFC). However, the communication method is not limited thereto and may include a technology of wireless communication that will be developed in the future.

The processing unit 120 is configured to perform various processes related to movement and operation control of the robot, gripping operation of the robot arm, determining a level of risk, and movement control of the robot arm based on the risk level determination, and image processing and recognition. For example, the processing unit 120 may include a central processing unit (CPU), an application processor (AP), and the like, and may include a memory therein to store commands or data related to at least one other element, or may access necessary information by communicating with the memory unit 150 in the apparatus or an external memory if necessary.

According to an embodiment, the processing unit 120 may include a risk level determining unit 121, a movement controller 122, and an image processing unit 123, and these elements may include a program or a program module that may be executed by at least one processor. The program or the program module included in the processing unit 120 may be configured in the form of an operating system, an application program, a program, or the like, and may be physically stored in various types of storage apparatuses that are widely used. Such programs or program modules may include, but are not limited to, various forms for performing one or more routines, subroutines, programs, objects, components, instructions, data structures, and specific tasks or executing specific data types.

The risk level determining unit 121 may be configured to determine a risk level that is a level of risk associated with movement and operation of the robot, and may determine both a risk level associated with an object that the robot carries and transfers or is gripped by the robot arm and a risk level associated with contents included in the object. For example, as an attribute of an object transferred by a robot or a robot arm, the level of risk may be determined based on a weight, a temperature, a fragility, a sharpness, a height, and a size of the object.

For example, the risk level determining unit 121 may consider the weight, temperature, and presence of a cover of a transferred object, or may determine a risk level based on whether a content is present in the object such as a cup or the like, and the weight, temperature, and attribute of the content. More specifically, when the object transferred by a robot is a container such as a cup, and a liquid is included therein, when the weight of the object including the internal components is large, it is determined that the level of risk is higher than a case in which the weight is small, when the temperature is high, it is determined that the level of risk is higher than a case in which the temperature is low, and when a cover of the object is not present, it is determined that the level of risk is higher than a case in which the cover of the object is present. The weight, temperature, and presence or absence of the cover of the transferred object may be obtained by using various methods such as values of various sensors installed in the robot, image recognition of the object, or information recognition related to the object from an external server.

In addition, the risk level determining unit 121 may determine whether an object (or obstacle) such as a person exists around the moving robot and a distance between the robot and the object, and determine that the level of risk is high when it is determined that the object exists within a predetermined reference distance, thereby stopping the movement of the robot, lowering the speed of the movement, or changing the moving path to be distant from the object.

In addition, the risk level determining unit 121 may differently determine a level of risk according to a method of transferring an object. For example, when an object is held at a grip part by at least two fingers or fixed by a fixing part such as a cup tray, the risk level determining unit 121 may determine the risk to be low, and when the object is simply put on a plate and transferred in a non-fixed state, the risk level determining unit 121 may determine the risk to be relatively high.

The movement controller 122 may be configured to control the movement of the robot based on the risk level determined by the risk level determining unit 121. For example, when the risk level determined by the risk level determining unit 121 is equal to or greater than a predetermined reference value, the movement controller 122 may dynamically control the movement of the robot to decrease the risk level. More specifically, when it is determined that the determined level of risk is higher than the predetermined reference, the movement controller 122 may control the movement to be stopped or control the movement speed to be decreased to a predetermined speed or less. In addition, a moving path and a moving range may be changed. For example, when it is determined that there is an object within a predetermined reference distance around the robot and the level of risk is high, the moving path of the robot is changed into a region in which the distance from the object is increased, thereby safely changing the moving path.

In addition, when it is determined that the risk level determined by the risk level determining unit 121 is higher than the predetermined reference, the movement controller 122 may temporarily stop the movement of the robot, continuously update the determination of the risk level, and resume the movement of the robot when the risk level satisfies the predetermined reference. As described above, the risk level determining unit 121 may perform the risk level determination in real time to dynamically and safely control the movement of the robot.

The image processing unit 123 is configured to perform a process of processing and recognizing an image obtained through the image sensor unit 160, and for example, may perform attributes such as a size, a height, a type, and a material of an object through image recognition, or may determine whether an object such as an obstacle exists around the image processing unit 123 and a distance from the object. For example, the image processing unit 123 may determine whether a cover of the object is present, and when the cover of the object is not present, the risk level determining unit 121 may determine that the risk level is higher than when the cover of the object is present. Also, as an example, the image processing unit 123 may determine whether an object exists around the robot apparatus 100, and when the object exists within a predetermined distance around the robot apparatus 100, the risk level determining unit 121 may determine that the risk level is high, and accordingly, the movement controller 122 may control to stop the movement of the robot or change the path or speed of the movement of the robot, and for example, may change the path of the movement of the robot into an area in which a distance from the object is increased.

The grip part 130 is a component of a robot arm that may be included in a robot apparatus, is configured to grip an object such as a cup, and may control movement through an articulation part.

The transfer part 140 is a component for placing an object such as a food or beverage to transfer the object, and may include, for example, a transfer plate for transferring a food or beverage and a collection plate for collecting dishes after a meal is finished. The transfer part 140 may have a tray structure for fixing a coffee cup or the like so as not to spill beverage or a general plate structure.

The memory unit 150 may store data received or generated by the robot apparatus 100. Also, commands or data related to at least one other element may be stored. For example, the storage apparatus may be a hard disk drive, a solid state drive (SSD), flash memory, or any other suitable storage apparatus including dynamic memory such as SRAM and DRAM. Various information necessary for an operation of determining the level of risk or controlling the movement of the robot may be stored in the memory unit 150. The data stored in the memory unit 150 may be accessed and read from the processing unit 120 as necessary.

The image sensor unit 160 may include a small camera capable of photographing a transferred object, a surrounding object on the moving path, and a surrounding environment, or various sensors, and may include a depth camera such as a stereo camera for measuring a distance. For example, by recognizing a character or an image printed on an object obtained through the image sensor unit 160, necessary information may be used. In addition, the image processing unit 123 may determine whether an object such as a person exists around the robot and a distance from the object through image recognition obtained from the image sensor unit 160, thereby stopping the movement of the robot, lowering a movement speed, or changing a moving path into an area in which the distance from the object is increased through the movement controller 122.

The weight sensor unit 170 may be installed in, for example, the transfer part 140 to sense a weight of an object to be transferred. For example, the weight sensor unit 170 may determine the weight of the object disposed on the plate of the transfer part 140 by measuring a pressure applied to the transfer part 140.

Also, the temperature sensor unit 180 may be installed in, for example, the transfer part 140 to sense a temperature of an object to be transferred. For example, when the temperature of the cup disposed on the transfer part 140 is measured by the temperature sensor unit 180, the temperature of the contents in the cup may be indirectly determined by indirectly recognizing the temperature of the liquid contained in the cup.

The display unit 190 may be configured to display information related to a risk as an image when the risk exceeds a predetermined reference. The display unit 500 may be, for example, a liquid crystal display (LCD), a light-emitting diode (LED) display, an organic LED (OLED) display, a micro LED, a micro electro mechanical systems (MEMS) display, an electronic paper display, or a touch screen, but is not limited thereto. Also, the display unit 190 may be implemented in the form of a projector capable of projecting an image, or may inform an image of a surrounding risky situation through the projector.

The audio output unit 200 may be configured to provide a user with an alarm, a notice, or a sound effect, output risk related information as an alarm sound, for example, output an alarm sound such as siren when the level of risk exceeds a predetermined reference, and notify the user of the risk related information by interworking with the display unit 190.

The display unit 190 and the audio output unit 200 may include a component for performing an additional function for conveniently providing information related to a risk level to a user, and may be selectively removed.

Figure 2:
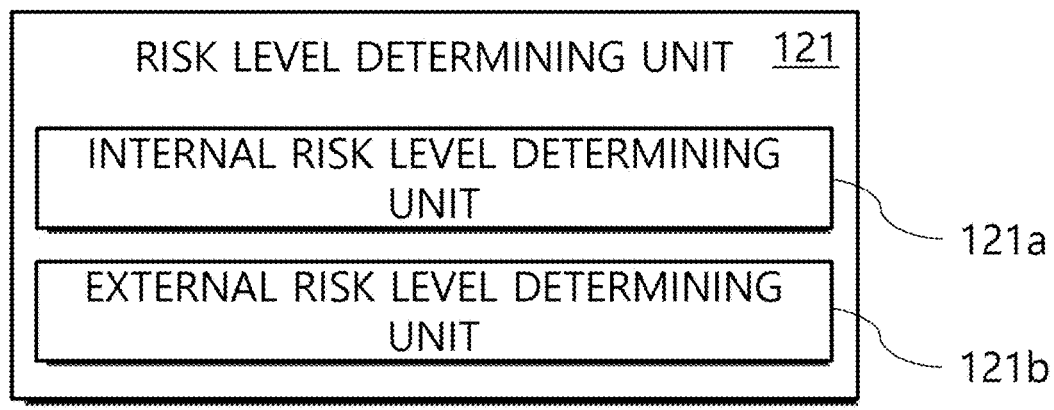
FIG. 2 is a block diagram of a detailed configuration of a risk level determining unit according to an embodiment of the present disclosure.

FIG. 2 is a block diagram illustrating a detailed configuration of a risk level determining unit according to an embodiment of the present disclosure.

The risk level determining unit 121 may include an internal risk level determining unit 121a configured to determine an internal risk level, and an external risk level determining unit 121b configured to determine an external risk level.

First, the internal risk level determining unit 121a may calculate and determine an internal risk level based on an attribute of an object transferred by a robot. Here, the attribute of the transferred object may include at least one of a weight, a temperature, a fragility, a sharpness, a height, and a size of the object, and a plurality of attributes of the object may be recognized through various sensors such as the image sensor unit 160, the weight sensor unit 170, and the temperature sensor unit 180. In detail, when the weight of the object is large, the risk may be determined to be higher than when the weight is small, when the temperature of the object is high, the risk may be determined to be higher than when the temperature is low, when the object includes a material that is easy to break, such as glass or the like, the risk may be determined to be higher than when the object includes a material that is difficult to break, such as plastic or the like, when the height of the object is high, the object is likely to fall and the risk may be determined to be higher than when the height of the object is low, and when the size of the object is large, the risk may be determined to be higher than when the size of the object is small.

Also, the internal risk level determining unit 121a may determine a risk according to a method of transferring an object, and for example, when transferring an object while covering the object with a cover, the internal risk level determining unit 121a may determine a risk to be lower than when transferring the object without the cover. Also, when a user grips an object with at least two fingers using a grip part or fixes a cup using a fixing part such as a tray or the like, the level of risk may be determined to be low, and when a user simply puts food or a cup on a plate and transfers the food or the cup in a state in which the food or the cup is not fixed, the level of risk may be determined to be relatively high.

Also, the internal risk level determining unit 121a may determine a risk based on a movement speed of the robot, and the movement controller 122 may control the movement speed of the robot to be decreased when it is determined that the risk is higher than a predetermined reference.

As described above, the internal risk level determining unit 121a may comprehensively determine the internal risk due to the internal factors based on an attribute of an object transferred by the robot, a transfer method, a movement speed of the robot, or the like.

Also, the risk level determining unit 121 may further include an external risk level determining unit 121b that determines an external risk level related to an environmental state around the robot.

Also, the external risk level determining unit 121b may determine the external risk level based on the moving path or whether the surrounding object exists, and the movement controller 122 may change the path or speed of the movement of the robot based on the external risk level.

For example, the external risk level determining unit 121b may determine whether an object is present within a predetermined distance around the robot, and when it is determined that the object is present, may stop the movement of the robot, or may change a moving path of the robot to a direction in which the object is not present or to decrease a movement speed of the robot when the risk is greater than a predetermined reference.

Also, when it is determined that an object such as a person exists on or around a moving path, the movement controller 122 may change the moving path of the robot in a direction in which a distance from the object is increased.

In addition, the external risk level determining unit 121b may determine a risk level related to an obstacle located on a path to a destination to which the robot is moving, and the movement controller 122 may control the movement of the robot through the path to reduce the risk level. Here, the risk level related to the obstacle is related to at least one of a number of obstacles located on the path to the destination, the type of obstacle, and whether the obstacle moves, and the obstacle may include an object such as a person.

As described above, the risk level determining unit 121 may determine a risk level by comprehensively considering an internal risk level and an external risk level through the internal risk level determining unit 121a and the external risk level determining unit 121b, and may dynamically control the movement of the robot to reduce the risk level according to the risk level determined in real time.

Also, for example, when the internal risk determined by the internal risk level determining unit 121a is less than a predetermined reference, the moving path may be determined without considering the external risk, and when the internal risk is greater than the predetermined reference, the moving path for reducing the external risk may be selected to reduce the risk level.

Figure 3:
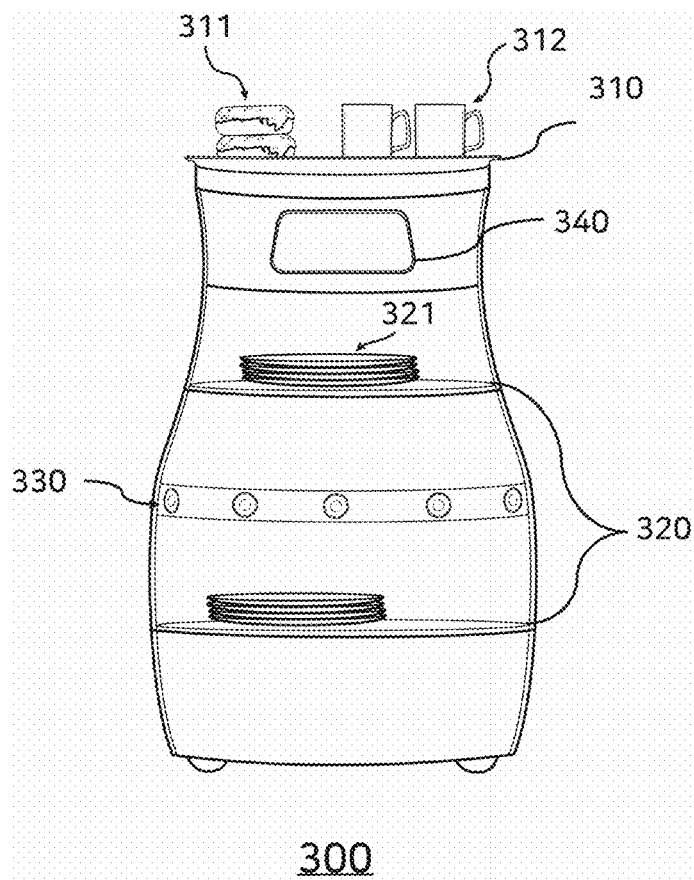
FIG. 3 is a view of a configuration of a transfer robot according to an embodiment of the present disclosure.

FIG. 3 is a view of a configuration of a transfer robot according to an embodiment.

Referring to a transfer robot 300 according to an embodiment of the present disclosure, the transfer robot 300 may include at least one transfer plate 310 on which an object such as a food and beverage of the transfer robot 300 may be disposed. The transfer plate 310 may be positioned at an uppermost end of the transfer robot 300 to allow the food and beverage ordered by a customer to be easily taken.

A food 311 such as bread on a dish and a cup 312 containing a beverage such as coffee and water may be disposed on the transfer plate 310 to be transferred to a customer by the transfer robot 300.

A plurality of collecting plates 320 may be provided at a middle lower end of the transfer robot 300. Because the collecting plate 320 is a plate for collecting dishes after other customers have eaten or drunk, such as leftover side dishes, and may cause inconvenience to other customers' eating and drinking, the collecting plate 320 may be provided at middle and lower end portions of the transfer robot 300 so as to be covered by the other portion of the transfer robot 300 and not to be seen to the outside. A plate 321 in which a meal has been completed may be disposed on the collection plate 320.

A sensor unit 330 may be configured to sense a situation around the transfer robot 300 so that the transfer robot 300 may perform movement, transfer, and collecting operations without any problems. The sensor unit 330 may include at least one image sensor, at least one distance sensor, at least one weight sensor, and at least one photo sensor. For example, the image sensor may include, but is not limited to, a time of flight (ToF) three-dimensional image sensor. The image sensor may detect a peripheral portion of the transfer robot 300 to effectively avoid an obstacle when the transfer robot 300 moves. The weight sensor may be provided on the transfer plate 310 or the collection plate 320 to sense whether each plate is empty or a food, a drink, or a dish is loaded.

The photo sensor is a sensor for avoiding an obstacle, and may include, for example, a light detection and ranging (LiDAR) using a MEMS scanner. Because a general LiDAR technique scans with a large electric motor using direct current (DC) driving, volume, weight, and power consumption are large and thus are not suitable for being mounted on the transfer robot 300, but the MEMS scanner is a subminiature scanner and may significantly reduce volume, weight, and power consumption and thus may be suitable for the transfer robot 300. In the obstacle avoidance of the transfer robot 300, an avoidance algorithm may be operated by fusing a three-dimensional image sensor and a sensing signal of the LiDAR, and the obstacle avoidance may be appropriate for an in-store environment having various collision variables.

A display 340 may be configured to display information related to the level of risk during movement, show a menu of a store to a customer so that the customer may place an order, or receive an order through a user input in the form of a touch screen. The display 340 may include a display capable of receiving a touch input, and may be integrated with a speaker. Also, the display 340 may be implemented in the form of a projector capable of projecting an image, and may inform an image of a surrounding risky situation through the projector.

Figure 4:
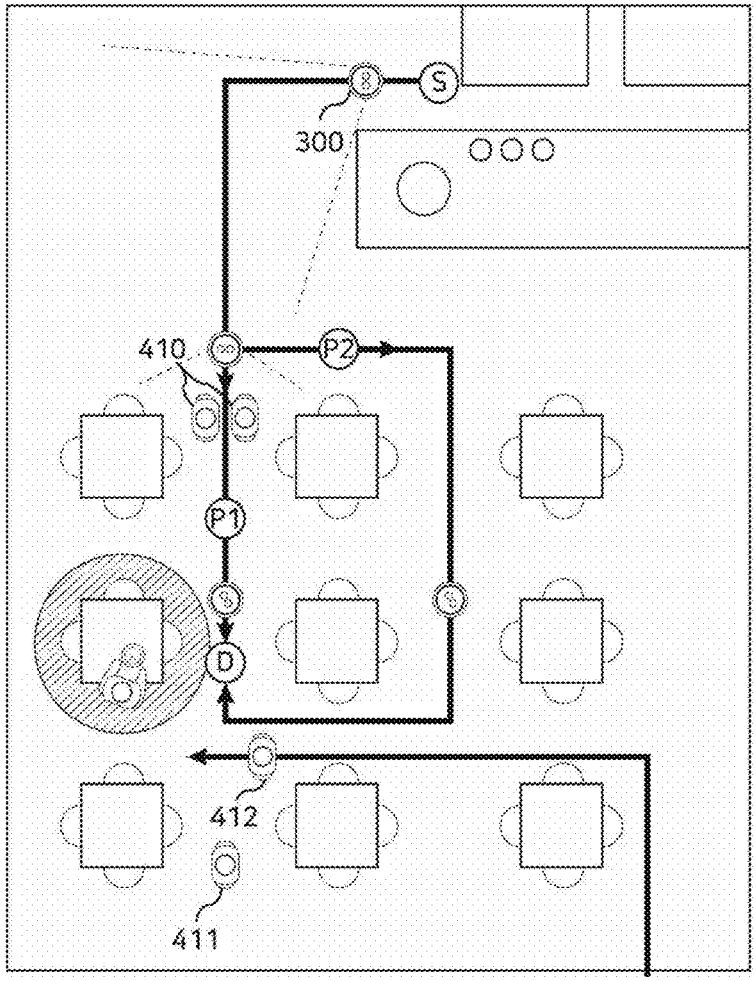
FIG. 4 is a view of a movement control of a transfer robot based on determination of a risk level according to an embodiment of the present disclosure.

FIG. 4 is an exemplary view of a movement control of the transfer robot based on risk level determination according to an embodiment of the present disclosure.

Referring to FIG. 4, the transfer robot 300 may select and move one of a first path P1, which is the shortest path, and a second path P2, which is a detour path, based on the determination of the level of risk to move from a start point S to an arrival point D. In a case of the first path P1, an obstacle 410 such as a person may be present, and thus, it may be determined that an external risk level is high, and thus, movement may be controlled to return to the second path P2 having a low risk level.

In this case, the transfer robot 300 may determine an internal risk level, and when the internal risk level is lower than a predetermined reference based on an attribute of an object transferred by the transfer robot 300, even if the obstacle 410 is present, for example, while notifying a risk through the display 340, the transfer robot 300 may induce a person who is the obstacle 410 to step aside in the path of the transfer robot 300, and may control the transfer robot 300 to move to the first path P1 while reducing a movement speed. Meanwhile, when the internal risk level is greater than the predetermined reference, when it is determined that the external risk level along the first path P1 is greater than the predetermined reference due to the obstacle 410, the moving path may be set to bypass the obstacle 410 to the second path P2 and reduce the risk level.

The level of risk associated with the obstacle may be calculated and determined based on a number of obstacles positioned on the path from the start point S to the arrival point D, the type of the obstacle, and whether the obstacle moves, for example, when the number of obstacles is large, the level of risk may be determined to be high, when the type of the obstacle is a person, the level of risk may be determined to be high, when the person is a moving person, the level of risk may be determined to be higher than a case in which the person is not moving. The number and type of the obstacle on the moving path and whether the obstacle moves may be determined based on information obtained through the sensor unit 330 of the transfer robot 300.

Figure 5:
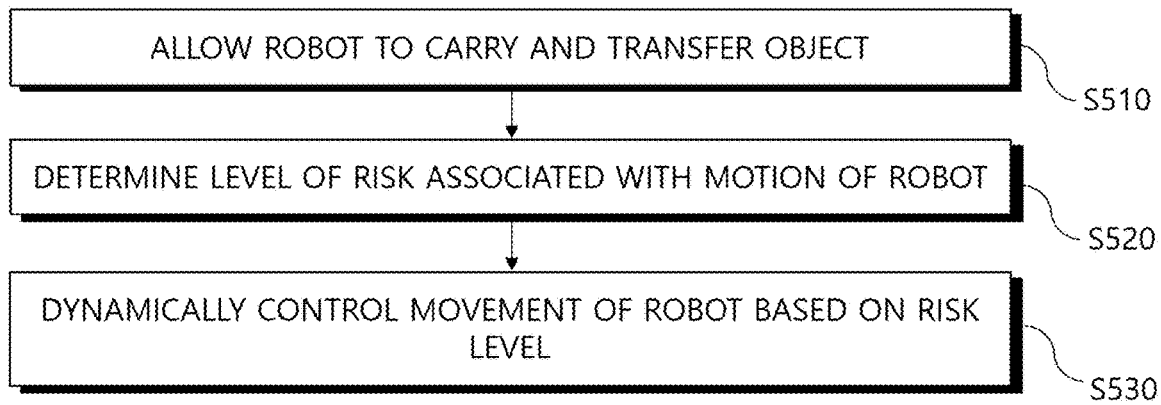
FIG. 5 is a flowchart of a method of controlling a movement of a robot based on determination of a risk level according to an embodiment of the present disclosure.

FIG. 5 is a flowchart of a method of controlling a movement of a robot based on determination of a risk level according to an embodiment of the present disclosure.

First, the robot may carry and transfer an object, and the object may include a food beverage and the like, and may be disposed on the transfer plate 310 of the robot, in operation S510.

The risk level determining unit 121 may determine a level of risk associated with the motion or movement of the robot during the transfer of the robot in real time, in operation S520.

In operation S530, the movement controller 122 may dynamically control the movement of the robot in real time based on the determined level of risk. For example, when it is determined that the level of risk is higher than a predetermined reference, the movement speed of the robot may be controlled to be decreased, the movement may be stopped, or the moving path may be changed, thereby improving safety.

Figure 6:
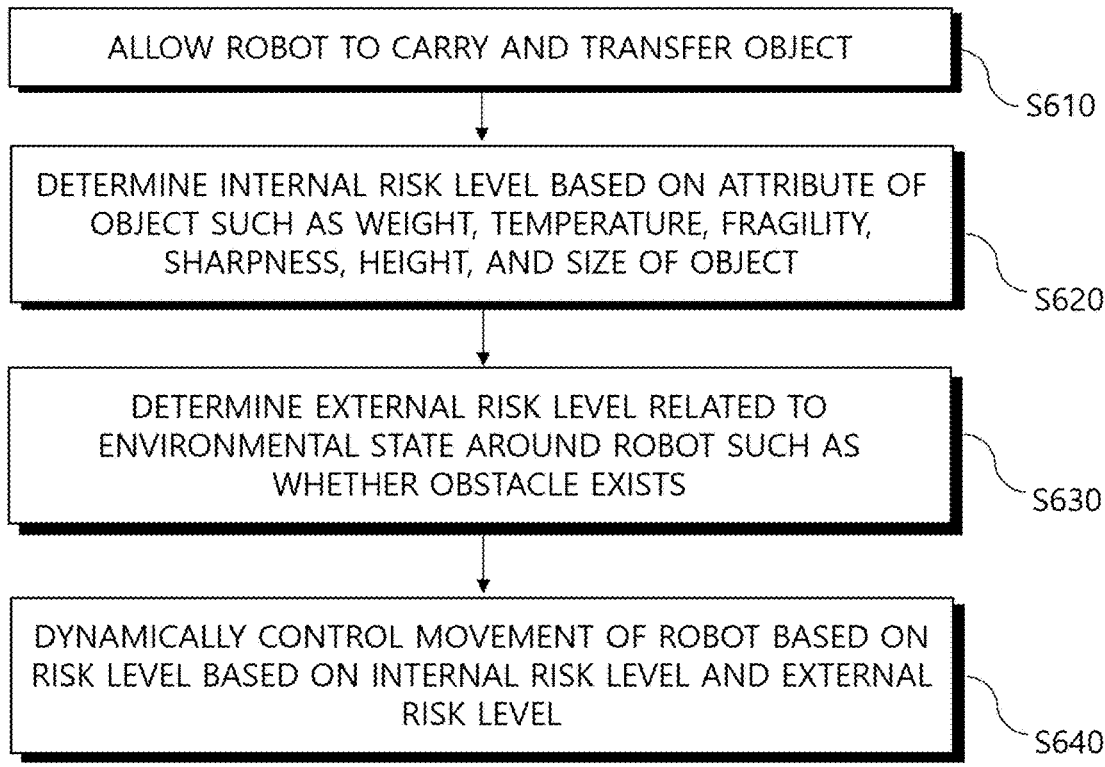
FIG. 6 is a flowchart of a method of controlling a movement of a robot based on determination of a risk level according to another embodiment of the present disclosure.

FIG. 6 is a flowchart of a method of controlling a movement of a robot based on determination of a risk level according to another embodiment of the present disclosure.

First, the robot may carry and transfer an object, and the object may include a food and beverage and the like, and may be disposed on the transfer plate 310 of the robot, in operation S610.

Next, the robot may determine an internal risk level based on an attribute of the object, such as the weight, temperature, fragility, sharpness, height, and size of the object, as the attribute related to the object being transferred, for example, the food and beverage and the like, in operation S620.

In addition, an external risk level related to an environmental state around the robot, such as whether an obstacle exists on a moving path, or the like, may be further determined, in operation S630.

The movement of the robot may be dynamically controlled based on the internal risk level and the external risk level determined as described above, in operation S640. For example, when it is determined that the level of risk is higher than a predetermined reference, the movement speed of the robot may be controlled to be decreased, the movement may be stopped, or the moving path may be changed to a direction in which the robot moves away from the object or a detour path in which there is no obstacle.

Also, when the determined internal risk level is less than the predetermined reference, the moving path may be determined without considering the external risk, and when the internal risk is greater than the predetermined reference, the moving path may be selected to lower the external risk level, thereby controlling to lower the risk level.

Figure 7:
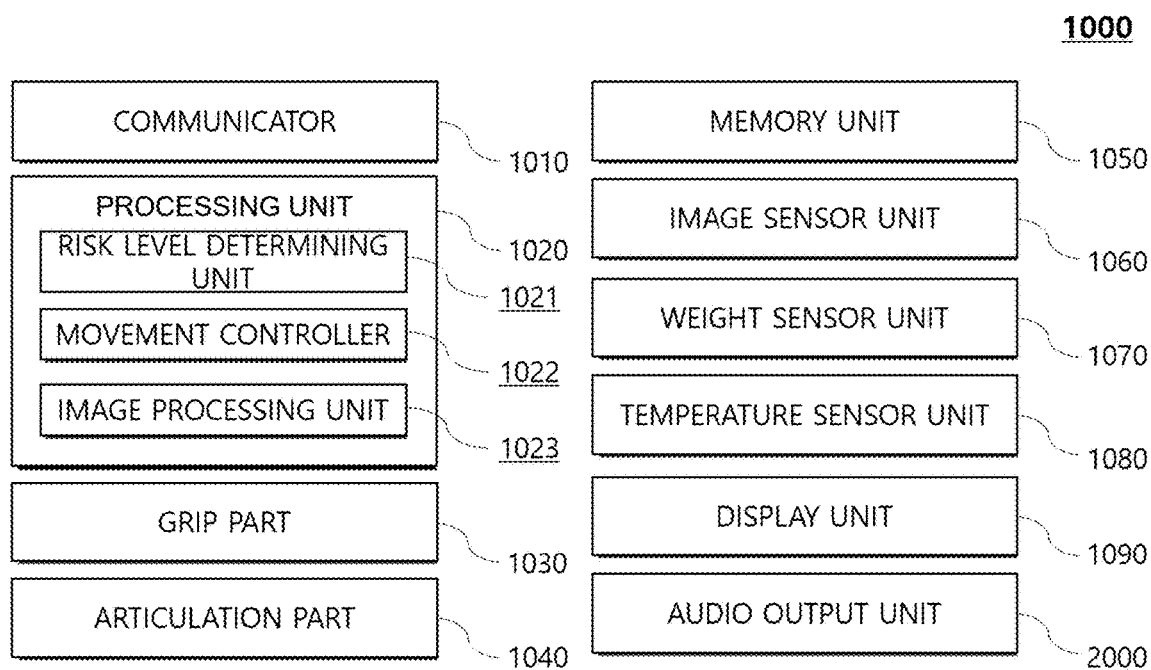
FIG. 7 is a block diagram of a configuration of a robot arm apparatus of which movement is controlled based on determination of a risk level according to an embodiment of the present disclosure.

FIG. 7 is a block diagram illustrating a configuration of a robot arm apparatus of which movement is controlled based on a risk level determination according to an embodiment of the present disclosure.

Referring to FIG. 7, a robot arm apparatus 1000 may include a communicator 1010, a processing unit 1020, a grip part 1030, an articulation part 1040, a memory unit 1050, an image sensor unit 1060, a weight sensor unit 1070, a temperature sensor unit 1080, a display unit 1090, and an audio output unit 2000.

The communicator 1010 is configured to receive necessary information from an external server or an external apparatus, or transmit obtained information to the external server or the external apparatus, and the network may be a network connected by wire or wirelessly. Also, the network may be a network to which an external apparatus and the robot arm apparatus 1000 are directly connected, or may be a private network generated by a repeater. The network may be a communication network that is a high-speed backbone network of a large-sized communication network capable of large-capacity, long-distance voice, and data service, and may be a next-generation wired/wireless network for providing an Internet or a high-speed multimedia service. When the network is a wireless communication network, the network may include cellular communication or near field communication. For example, the cellular communication may include at least one of long-term evolution (LTE), LTE advanced (LTE-A), $5^{th}$ generation (5G), code division multiple access (CDMA), wideband CDMA (WCDMA), universal mobile telecommunications system (UMTS), wireless broadband (WiBro), and global system for mobile communications (GSM). The near field communication may include at least one of wireless fidelity (Wi-Fi), Bluetooth, Zigbee, and near field communication (NFC). However, the communication method is not limited thereto and may include a technology of wireless communication that will be developed in the future.

The processing unit 1020 is configured to perform various processes related to movement and gripping operations of the robot arm, a risk level determination, a movement control of the robot arm based on the risk level determination, and image processing and recognition operation. For example, the processing unit 1020 may include a central processing unit (CPU), an application processor (AP), and the like, and may include a memory therein to store commands or data related to at least one other component, or may access necessary information by communicating with the memory unit 1050 in the apparatus or an external memory if necessary.

According to an embodiment, the processing unit 1020 may include a risk level determining unit 1021, a movement controller 1022, and an image processing unit 1023.

First, the risk level determining unit 1021 may be configured to determine a risk level that is a level of risk associated with a motion of the robot arm, and may determine both a risk level associated with an object gripped by the robot arm and a risk level associated with contents included in the object. For example, the risk level may be determined based on the weight, temperature, and presence of a cover of an object gripped by the robot arm, or based on the weight, temperature, and attribute of the content and presence of the content in the object such as a cup. More specifically, when the object gripped by the robot arm is a container such as a cup, and a liquid is contained therein, when the weight of the object containing internal components is large, it is determined that the level of risk is higher than a case of the small weight, when the temperature is high, it is determined that the level of risk is higher than a case of the low temperature, and when the cover of the object is not present, it is determined that the level of risk is higher than a case when the cover of the object is present. The weight, temperature, and presence or absence of the cover of the object may be obtained by using various sensor values installed in the robot arm, image recognition of the object, or information recognition related to the object from an external server.

Also, the risk level determining unit 1021 may determine whether an object such as a person exists around the robot arm and a distance between the robot arm and the object, and determine that the risk level is high when it is determined that the object exists within a predetermined reference distance, thereby stopping the movement of the robot arm, lowering a movement speed, or changing a path of the movement to be distant from the object.

In addition, the risk level determining unit 1021 may determine a risk level differently according to a method of gripping an object. For example, the risk level determining unit 1021 may determine the risk to be low when the object is gripped by at least eight hands or fingers through a grip part, and may determine the risk to be relatively high when the object is gripped by using a single bar-shaped grip part or when the object is fixed by being inserted into a coupling part of the object.

The movement controller 1022 may be configured to control the movement of the robot arm based on the risk level determined by the risk level determining unit 1021. For example, when the level of risk determined by the risk level determining unit 1021 is equal to or greater than a predetermined reference value, the movement controller 1022 may control the movement of the robot arm to decrease the risk level. More specifically, when it is determined that the determined level of risk is higher than a predetermined reference, the movement controller 1022 may control to stop the movement or control the movement speed to be decreased to a predetermined speed or less. For example, when it is determined that there is an object within a predetermined reference distance around the robot and thus the level of risk is high, the moving path of the robot arm is changed into a region in which a distance from the object is increased, thereby safely changing the moving path.

The image processing unit 1023 is configured to perform a process of processing and recognizing an image obtained through the image sensor unit 1060, and for example, may perform attributes of a cup or other objects for gripping through image recognition or determine whether an object exists around the image or a distance from the object. As an example, the image processing unit 1023 may determine whether the cover of the object is present, and when the risk level determining unit 1021 determines that a cover of the object is not present, the risk level determining unit 1021 may determine that the risk is higher than when the cover of the object is present. Also, as an example, the image processing unit 1023 may determine whether an object exists around the robot arm apparatus 1000, and when the object exists within a predetermined distance around the robot arm apparatus 1000, the risk level determining unit 1021 may determine that the level of risk is high, and accordingly, the movement controller 1022 may control the robot arm to stop moving or change a path or speed of the movement of the robot arm, and for example, may change the path of the movement of the robot arm into a region in which a distance from the object is increased.

The grip part 1030 is configured to allow the robot arm to grip an object such as a cup. The grip part 1030 may be coupled to one side of an articulation part 1040. Also, the articulation part 1040 may include a plurality of articulation units and a plurality of arm joints connected to the articulation units. Because the articulation part may perform three-dimensional rotation, movement of the plurality of arm joints may be controlled through rotation of the plurality of articulation units. One side coupled to the grip part 1030 may be one side of the plurality of arm joints.

The memory unit 1050 may store data received or generated by the robot arm apparatus 1000. Also, commands or data related to at least one other element may be stored. For example, it may be a hard disk drive, a solid state drive, flash memory, or any other suitable storage apparatus including dynamic memory such as SRAM and DRAM. Various information necessary for an operation of determining a level of risk or controlling movement of the robot arm may be stored in the memory unit 1050. The data stored in the memory unit 1050 may be accessed and read from the processing unit 1020 as necessary.

The image sensor unit 1060 may include at least one small camera capable of photographing an object such as a cup and a surrounding object, and may include a depth camera such as a stereo camera to measure a distance. For example, by recognizing characters or images printed on a cup obtained through the image sensor unit 1060, necessary information may be utilized. In addition, the image processing unit 1023 may determine whether an object such as a person exists around the robot arm and a distance from the object through image recognition obtained from the image sensor unit 1060, and thus, the movement controller 1022 may stop the movement of the robot arm, decrease a movement speed, or change a moving path into a region in which the distance from the object is increased.

The weight sensor unit 1070 may be installed on one side or both sides of the grip part 1030 to sense a weight of the object gripped by the grip part 1030. For example, the weight sensor unit 1070 may indirectly determine the weight of the object gripped by the grip part 1030 by measuring a pressure applied to the grip part 1030.

Also, the temperature sensor unit 1080 may be installed on one side or both sides of the grip part 1030 to sense a temperature of an object gripped by the grip part 1030. For example, when the temperature sensor unit 1080 measures the temperature of the cup gripped by the grip part 1030, the temperature of the contents in the cup may be indirectly determined by indirectly recognizing a temperature of the liquid contained in the cup.

The display unit 1090 may be configured to display information related to a risk as an image when the risk exceeds a predetermined reference. The display unit 500 may be configured in the form of, for example, an LCD; an LED display, an OLED display, a micro LED, a MEMS display, an electronic paper display, or a touch screen, but is not limited thereto.

The audio output unit 2000 may be configured to provide a user with an alarm, a notice, or a sound effect as a sound, output information related to risk as an alarm sound, for example, output the alarm sound such as a siren when the level of risk exceeds a predetermined reference, and inform the user of the information related to risk by interworking with the display unit 1090.

The display unit 1090 and the audio output unit 2000 are components for performing an additional function for conveniently providing risk related information to a user, and may be selectively removed.

Figure 8:
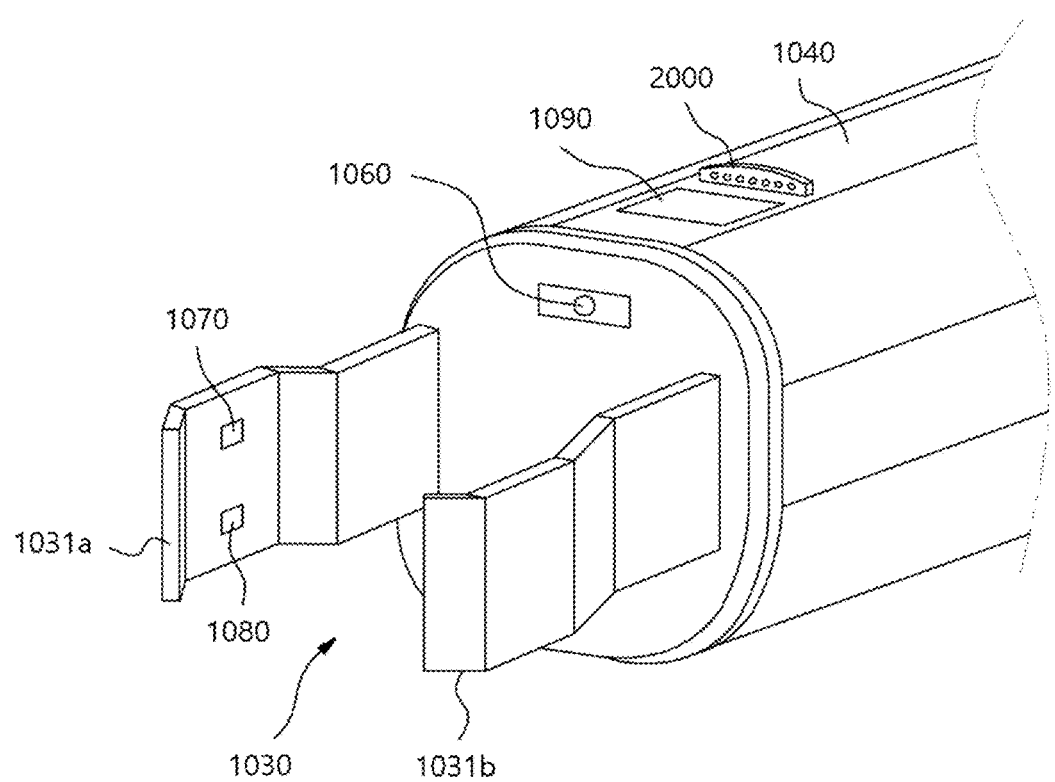
FIG. 8 is a view of a configuration of a robot arm apparatus according to an embodiment of the present disclosure.

FIG. 8 is a view of a configuration of a robot arm apparatus according to an embodiment of the present disclosure.

According to an example, a robot arm apparatus 1000 may be configured as illustrated in FIG. 8, and a detailed form or arrangement method may be variously changed. Although only some of the grip part 1030 and the articulation part 1040 of the robot arm apparatus 1000 are illustrated in FIG. 8, the robot arm apparatus 1000 may be configured as an articulated robot arm, and may be configured as a complete robot by being coupled to a movable robot body.

The grip part 1030 may be coupled to one side of the articulation part 1040, and the grip part 1030 may include a first gripper 1031*a* and a second gripper 1031*b*. The first gripper 1031*a* and the second gripper 1031*b* may grip a cup or an object under the control of the processing unit 1020. When the grip part 1030 grips a cup or an object, the first gripper 1031*a* and the second gripper 1031*b* may grip the cup or the object by reducing a distance between the first gripper 1031*a* and the second gripper 1031*b* according to a width of the object. The width of the cup or the object may be measured by image scanning of the image sensor unit 1060, and the processing unit 1020 may control a gap between the first gripper 1031*a* and the second gripper 1031*b* according to the measured width. The shape of the grip part 1030 illustrated in FIG. 8 is not limited to the illustrated shape and may be any shape capable of gripping a cup or an object. Also, a number of grippers included in the grip part 1030 may be one or more, and the grip part 1030 may be formed in various shapes to grip various types of objects.

As shown in FIG. 8, the image sensor unit 1060 may be formed at one side of the articulation part 1040 to photograph and recognize a cup or an object for gripping or to photograph and recognize an object existing around the robot arm apparatus 1000. By recognizing the image obtained from the image sensor unit 1060, an attribute of the object for gripping may be determined, or by determining whether an object such as a person exists around the robot arm, a movement of the robot arm may be stopped, the movement speed may be decreased, or the moving path may be changed into an area in which a distance from the object is increased. Also, the image sensor unit 1060 may determine a distance from the object by obtaining a depth image. Also, the image sensor unit 1060 may be located at various positions where an object or an entity around the robot arm apparatus 1000 may be photographed, even if the image sensor unit 1060 is not at one side of the articulation part 1040.

The weight sensor unit 1070 and the temperature sensor unit 1080 may be installed on one side or both sides of the grip part 1030 to sense the weight or temperature of the object gripped by the grip part 1030.

The display unit 1090 and the audio output unit 2000 may be disposed on an upper surface of the articulation part 1040 so as to conveniently provide information related to the level of risk to a user in an image or voice, and may be disposed at another position or component of the robot arm apparatus 1000 so as to output an image or voice to the user.

Figure 9A:
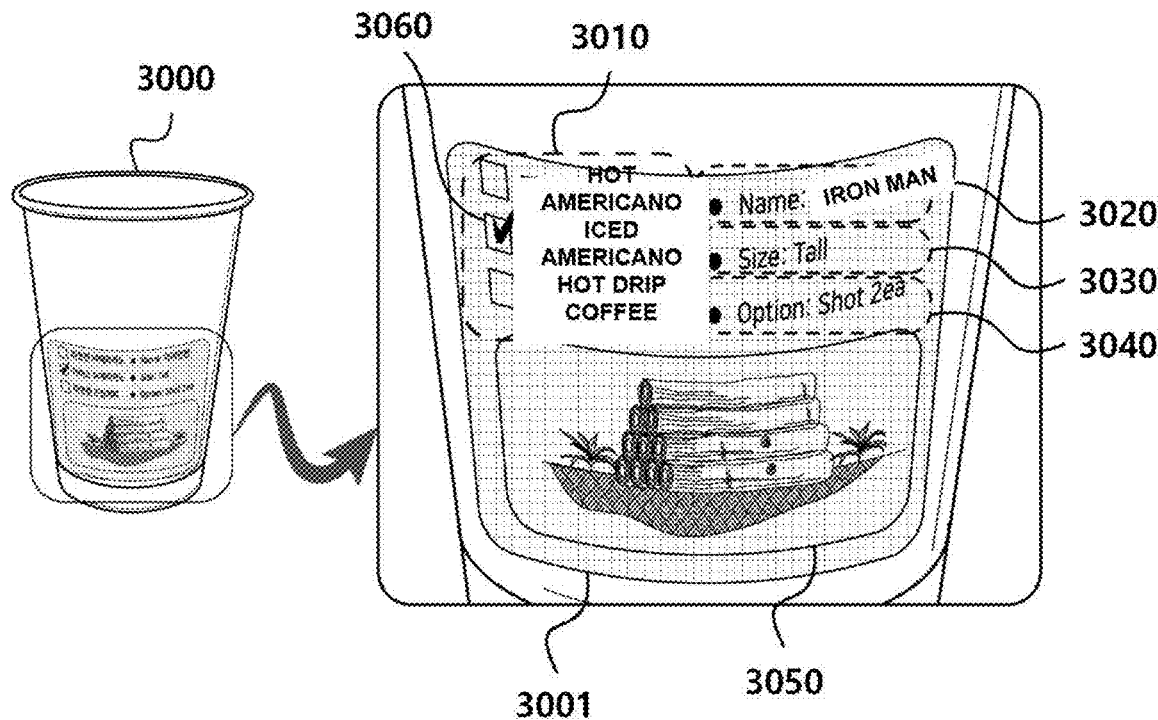
FIGS. 9A and 9B are views of a process of determining a risk level through image recognition of a cup containing a beverage according to an embodiment of the present disclosure.
Figure 9B:
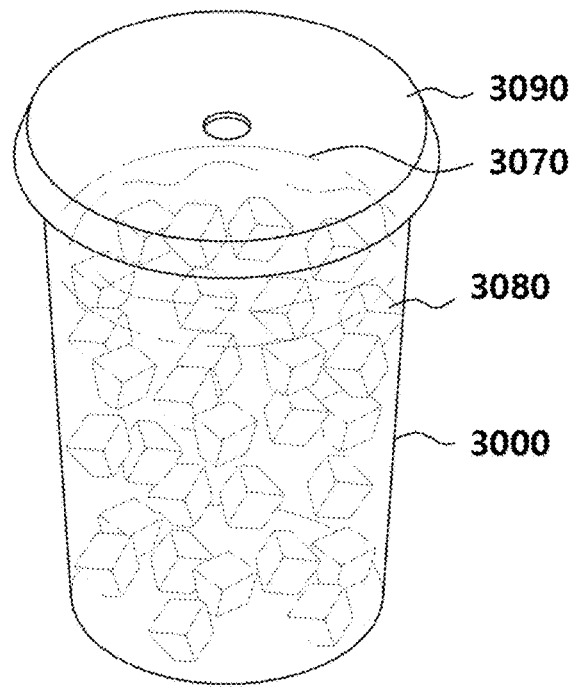

FIGS. 9A and 9B are exemplary views of a process of determining a risk level through image recognition of a cup containing a beverage according to an embodiment of the present disclosure.

Referring to FIG. 9A, various pieces of information related to the contents of a cup 3000 are identified based on the image recognition in a printing area 3001 of the cup 3000 recognized through the image sensor unit 1060 and the image processing unit 1023.

For example, the printing area 3001 of the cup 3000 may include an ordered beverage name 3010, an orderer's name 3020, a beverage size 3030, beverage recipe or option information 3040, other order requests or an image 3050, and marking information 3060 including check marks, and the like, may identify attribute information of contents of the cup 3000 and the cup 3000 based on image processing and text processing through the image sensor unit 1060 and the image processing unit 1023, and may perform risk level determination based on the attribute information.

For example, the image processing unit 1023 may recognize that the content of the cup 3000 is 'Iced Americano' through text recognition of the marking information 3060 and the ordered beverage name 3010, and thus may determine that the content of the cup 3000 is coffee and the temperature of the content is low due to ice. Based on the information obtained by the image processing unit 1023, the risk level determining unit 1021 may determine that a risk level of contents due to temperature is lower than that of hot coffee.

Further, referring to FIG. 9B, an example of determining the level of risk by recognizing an attribute of the cup 3000 or the content through image recognition of the cup 3000 will be described. For example, when the cup 3000 is a transparent cup such as a glass cup or a plastic cup, the contents in the cup 3000 are seen to be transparent, and accordingly, a height 3070 at which the contents (liquid) are filled, the presence of ice 3080, and the presence of a cover 3090 of the cup may be recognized through the image sensor unit 1060 and the image processing unit 1023. For example, when the height 3070 of the contents is high, it may be determined that the level of risk is high as compared with a case in which the height is low, when the ice 3080 is present, it may be determined that the level of risk due to the temperature is low as the ice 3080 is present by recognizing the temperature based on the presence of the ice 3080, and when the cover 3090 of the cup is present, it may be determined that the level of risk is low as the possibility of spilling a beverage is low as compared with a case in which the cover 3090 is not present.

As described above, according to an embodiment of the present disclosure, by using an image and text recognition process of the cup 3000 and the image of the content printed on the cup 3000, the attribute of the content in the cup 3000 may be identified, thereby automatically determining the level of risk.

Figure 10:
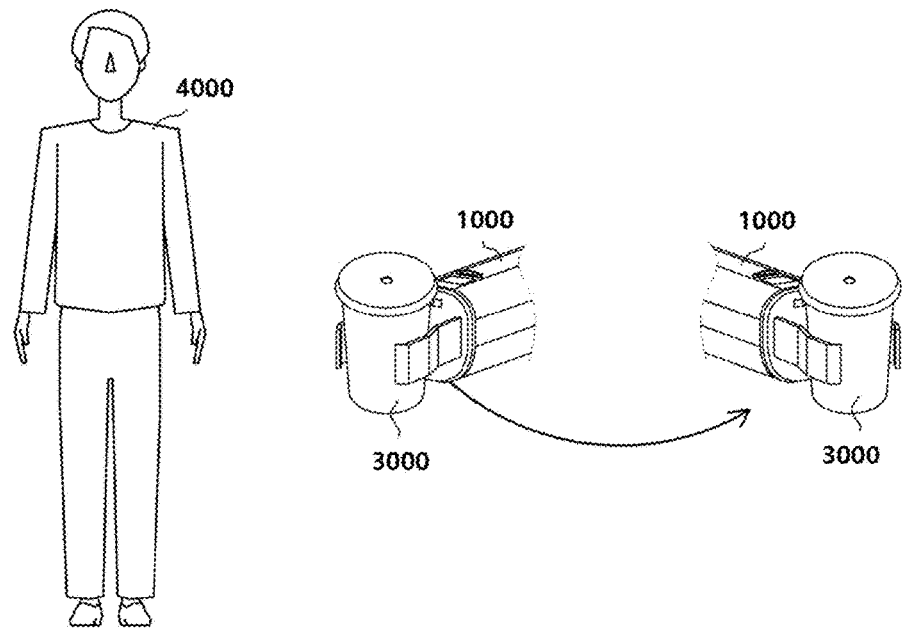
FIG. 10 is a view of a control of a change in a moving path of a robot arm according to an embodiment of the present disclosure.

FIG. 10 is an exemplary view of a control of a change in a path of movement of a robot arm according to an embodiment of the present disclosure.

The robot arm apparatus 1000 may freely move together with a movable robot body, or may move within a predetermined region by including only a robot arm including an articulated apparatus, and in this case, a moving object such as a person may exist in the movement region. In this case, in order to reduce a collision with the object or a potential risk possibility, the image processing unit 1023 may determine whether an object 4000 is present around the robot arm apparatus 1000 and a distance from the object 4000, and when the object 4000 is present within a predetermined reference distance around the robot arm apparatus 1000, the risk level determining unit 1021 may determine that the level of risk is high, and accordingly, the movement controller 1022 may control the robot arm to stop moving or change a path or speed of the movement, and for example, may change a path of the movement of the robot arm into a region in which a distance from the object is increased.

Referring to FIG. 10, although the robot arm apparatus 1000 currently moves while gripping the cup 3000, when the object 4000 such as a person is recognized within a predetermined distance from a front surface of the movement region, the robot arm apparatus 1000 may change a path of the movement in an opposite direction away from the object 4000 and move to the path in order to avoid a possibility of collision or risk with the object 4000, and then control to decrease a speed of the movement or stop the movement until the object 4000 is not within the predetermined distance. Also, when the object 4000 exists within the predetermined reference distance, a risk may be output through the display unit 1090 and the audio output unit 2000 in an image or voice, thereby effectively informing the object 4000 of the risk.

Figure 11:
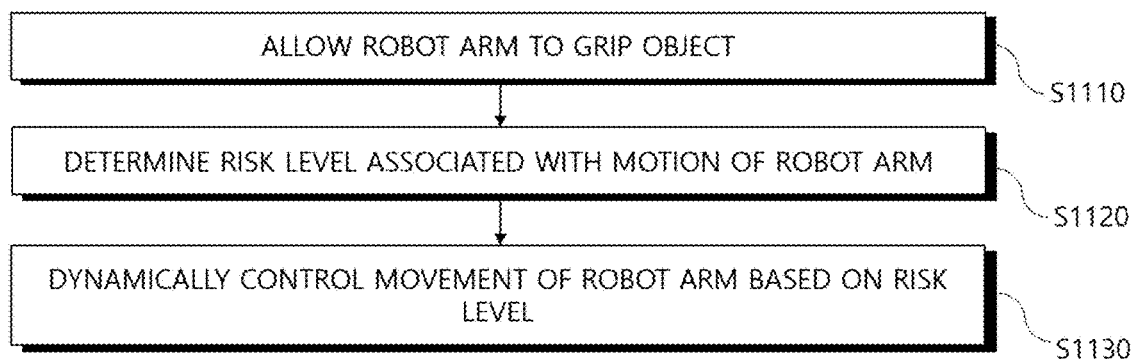
FIG. 11 is a flowchart of a method of controlling a movement of a robot arm based on determination of a risk level according to an embodiment of the present disclosure.

FIG. 11 is a flowchart of a method of controlling movement of a robot arm based on determination of a risk level according to an embodiment of the present disclosure.

First, a robot arm apparatus grips an object, and contents may be included in the object, in operation S1110.

Next, a level of risk associated with an operation or movement of the robot arm may be determined based on attributes of the object gripped by the robot arm, for example, weight, temperature, and presence or absence of a cover, in operation S1120.

In operation S1130, the movement of the robot arm may be dynamically controlled in real time based on the determined risk level. For example, when it is determined that the risk level is higher than a predetermined reference, a movement speed of the robot arm may be decreased, the movement may be stopped, or a moving path may be changed, thereby improving safety.

Figure 12:
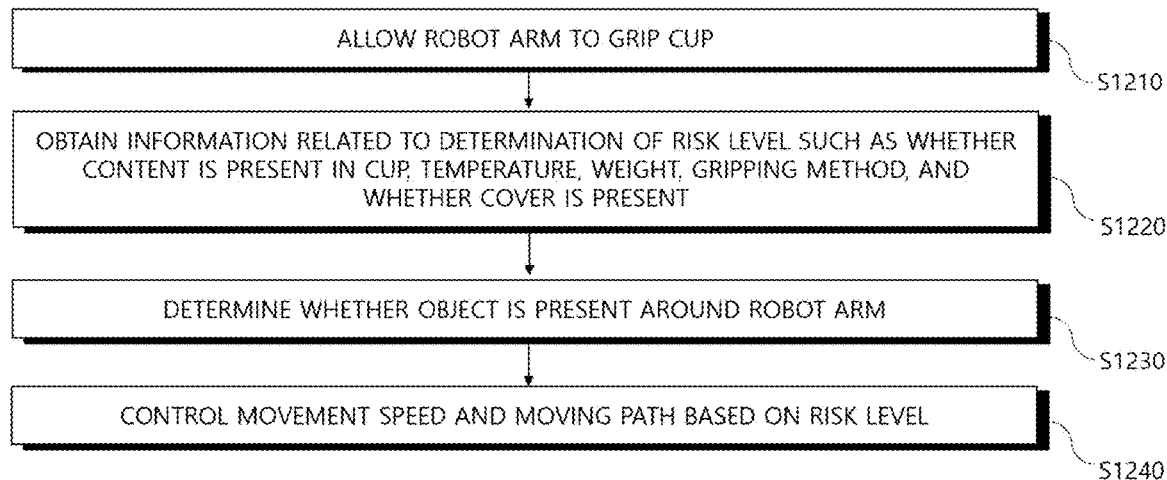
FIG. 12 is a flowchart of a method of controlling a movement of a robot arm based on determination of a risk level according to another embodiment of the present disclosure.

FIG. 12 is a flowchart of a method of controlling movement of a robot arm based on determination of a level of risk according to another embodiment of the present disclosure.

First, a robot arm apparatus grips an object, and for example, the gripped object may be a cup, and the cup may include contents such as a beverage such as coffee, in operation S1210.

Next, the level of risk associated with the motion or movement of the robot arm may be determined based on attributes of the object (cup) gripped by the robot arm and the contents (beverage) in the object, for example, whether the contents are present, temperature, weight, a gripping method, whether a cover is present, and the like, in operation S1220.

In addition, it is determined whether there is an object within a predetermined distance around the robot arm, and the results may be additionally considered to determine a risk level, in operation S1230.

In operation S1240, the movement of the robot arm may be dynamically controlled in real time based on the determined risk level. For example, when the weight of the cup is large, it is determined that the risk level is higher than a case where the weight of the cup is small, when the temperature of the cup or the content is high, it is determined that the risk level is higher than when the temperature of the cup or the content is low, and when the cover of the cup is not present, it is determined that the risk level is higher than when the cover is present, and it is determined that the risk level is higher as a distance between the cup and the object is close based on the presence or absence of the object and the distance, thereby performing the movement control based on the risk level. In this case, when it is determined that the level of risk is higher than a predetermined reference, the movement speed of the robot arm may be controlled to be decreased, the movement may be stopped, or the moving path may be changed in a direction away from the object.

One or more embodiments include a method and an apparatus for automatically determining a risk level related to an object transferred by a robot and more safely controlling a movement of the robot based on the determined risk level. One or more embodiments include a method and an apparatus for controlling a movement of a robot, capable of obtaining information related to a risk level in real time while the robot moves food and beverages and preventing a safety accident. One or more embodiments include a risk level determining apparatus capable of automatically determining an internal risk level related to an attribute of an object transferred by a robot. One or more embodiments include a risk level determining apparatus capable of automatically determining an external risk level related to an environmental state around the robot in relation to a movement of a robot. One or more embodiments include a method and apparatus for controlling a movement of a transfer robot based on determination of the internal risk level and the external risk level.

One or more embodiments include a method and an apparatus for automatically determining a level of risk related to an object such as a cup gripped by a robot arm and safely controlling a movement of the robot arm based on the determined risk level. One or more embodiments include a method and an apparatus for controlling a movement of a robot arm to obtain information related to a level of risk in real time while making a beverage, gripping a cup, or moving the beverage, and to prevent a safety accident. One or more embodiments include a risk level determining apparatus capable of automatically determining a risk level related to the making of a beverage using a robot arm and a grip and movement of a cup. According to one or more embodiments, by automatically determining an attribute of an object gripped by a robot arm and contents of the object, safe control of the robot arm based on determination of a level of risk may be implemented.

These effects of the present disclosure are not limited to the above-mentioned contents, and other unmentioned effects will be clearly understood by those of skill in the art from the above description.

Although the method and apparatus for controlling the movement of the robot based on the determination of the level of risk according to the embodiment of the present disclosure have been described in various embodiments in detail, the present disclosure is not limited thereto and should be construed as having the broadest range according to the basic concept described herein. Those of skill in the art may implement a pattern having a shape that is not appropriate by combining and substituting the described embodiments, but the present disclosure is not limited thereto. In addition, those of skill in the art may easily change or modify the embodiments described based on the present disclosure, and such changes or modifications are within the scope of the present disclosure.

What is claimed is:

1. A method of controlling a movement of a robot based on determination of a risk level, the method comprising:
    a risk level determining operation of determining the risk level related to a motion of the robot; and
    a robot control operation of controlling the movement of the robot based on the risk level,
    wherein the robot transfers an object,
    wherein the risk level determining operation comprises an internal risk level determining operation of determining an internal risk level based on an attribute of the object,
    wherein the risk level determining operation further comprises an external risk level determining operation of determining an external risk level related to an environmental state around the robot,
    wherein the attribute of the object includes at least one of weight, temperature, fragility, sharpness, height, and size, and
    wherein the robot control operation comprises:
    determining whether the internal risk level is less than a predetermined reference;
    in response to determining that the internal risk level is not less than the predetermined reference, determining a path of the movement of the robot such that the external risk level is reduced; and
    in response to determining that the internal risk level is less than the predetermined reference, determining the path of the movement of the robot without considering the external risk level.

2. The method of claim 1, wherein the internal risk level determining operation comprises determining a risk based on a movement speed of the robot, and
    the robot control operation comprises controlling the movement speed of the robot to be decreased when the risk is higher than the predetermined reference.

3. The method of claim 1, wherein the external risk level determining operation comprises determining whether the object exists within a predetermined distance around the robot, and
    when it is determined that the object exists, the robot control operation comprises stopping the movement of the robot or changing the path or speed of the movement of the robot when the external risk level is greater than the predetermined reference.

4. The method of claim 3, wherein, when it is determined that the object exists, the robot control operation comprises changing the path of the movement of the robot in a direction in which a distance from the object is increased.

5. The method of claim 1, wherein the robot control operation comprises temporarily stopping the movement of the robot and continuously updating the determination of the risk level when it is determined that the risk level is higher than the predetermined reference, and resuming the movement of the robot when the risk level satisfies the predetermined reference.

6. The method of claim 1, wherein the risk level determining operation comprises determining the risk level differently according to a way of transferring the object by the robot.

7. The method of claim 3, wherein the external risk level determining operation comprises determining the external risk level associated with an obstacle located on a path to a moving destination of the robot, and
    the robot control operation comprises controlling the movement of the robot to the path to reduce the external risk level.

8. The method of claim 7, wherein the risk level associated with the obstacle is related to at least one of a number of obstacles located on the path to the moving destination, a type of the obstacles, and whether the obstacles move, and the obstacles comprise a person.

9. The method of claim 1, wherein, when the risk level determined in the risk level determining operation exceeds the predetermined reference, risk related information is output through alarm sound or display information.

10. A robot apparatus of which movement is controlled based on determination of a risk level, the robot apparatus comprising:
    a risk level determining unit configured to determine the risk level related to a motion of the robot apparatus; and
    a movement controller configured to control a movement of the robot apparatus based on the risk level,
    wherein the robot apparatus transfers an object,
    wherein the risk level determining unit comprises an internal risk level determining unit configured to determine an internal risk level based on an attribute of the object,
    wherein the risk level determining unit further comprises an external risk level determining unit configured to determine an external risk level associated with an environmental state around the robot apparatus,
    wherein the attribute of the object includes at least one of weight, temperature, fragility, sharpness, height, and size, and wherein the movement controller is further configured to:

determine whether the internal risk level is less than a predetermined reference;

in response to determining that the internal risk level is not less than the predetermined reference, determine a path of the movement of the robot such that the external risk level is reduced; and in response to determining that the internal risk level is less than the predetermined reference, determine the path of the movement of the robot without considering the external risk level.

11. The robot apparatus of claim 10, wherein the internal risk level determining unit is further configured to determine a risk level based on a movement speed of the robot apparatus, and the movement controller is further configured to control the movement speed of the robot apparatus to be decreased when it is determined that the risk level is higher than the predetermined reference.

12. The robot apparatus of claim 10, further comprising an image processing unit configured to perform image processing, wherein the image processing unit is further configured to determine whether the object exists within a predetermined distance around the robot apparatus, the external risk level determining unit is further configured to determine the external risk level based on whether the object exists, and the movement controller is further configured to change a path or speed of the movement of the robot apparatus based on the external risk level.

13. The robot apparatus of claim 12, wherein, when it is determined that the object exists within the predetermined distance, the movement controller is configured to change the path of the movement of the robot apparatus in a direction in which a distance from the object is increased.

14. The robot apparatus of claim 10, wherein, when it is determined that the risk level determined by the risk level determining unit is higher than the predetermined reference, the movement controller is configured to temporarily stop the movement of the robot apparatus and continuously update the determination of the risk level, and when the risk level satisfies the predetermined reference, the movement controller is configured to resume the movement of the robot apparatus.

* * * * *